United States Patent [19]

Buhse et al.

[11] 4,405,834
[45] Sep. 20, 1983

[54] CIRCUIT FOR RECEIVING TWO-TONE/STEREOPHONIC PROGRAMS

[75] Inventors: Ulf Buhse, Kollmar; Henning Schwarz, Reinbek, both of Fed. Rep. of Germany

[73] Assignee: U.S. Philips Corporation, New York, N.Y.

[21] Appl. No.: 280,390

[22] Filed: Jul. 6, 1981

[30] Foreign Application Priority Data

Oct. 1, 1980 [DE] Fed. Rep. of Germany ....... 3036973

[51] Int. Cl.$^3$ ..................... H04N 5/60; H04H 5/00
[52] U.S. Cl. ........................... 179/1 GB; 179/1 GM; 358/144
[58] Field of Search ............... 179/1 GB, 1 D, 1 GC, 179/1 GD, 1 GN, 1 GM, 1 GQ; 358/142, 143, 144, 341–344; 370/69

[56] References Cited

U.S. PATENT DOCUMENTS

| | | | |
|---|---|---|---|
| 3,795,764 | 3/1974 | Altmann | 179/1 GB X |
| 4,016,366 | 4/1977 | Kurata | 179/1 GD |
| 4,272,788 | 6/1981 | Ogita | 179/1 GC X |
| 4,302,837 | 11/1981 | Tanaka et al. | 179/1 GB X |

FOREIGN PATENT DOCUMENTS 2223432 12/1973 Fed. Rep. of Germany ... 179/1 GB

OTHER PUBLICATIONS

"Multichannel Sound System for TV Broadcasting", Numaguchi et al., IEEE Consumer Electronics, 8/1981, pp. 366–370.

Primary Examiner—R. J. Hickey
Attorney, Agent, or Firm—Thomas A. Briody; William J. Streeter; Edward W. Goodman

[57] ABSTRACT

The invention relates to a circuit for use in a receiver which can receive two-tone/stereo signals. This circuit is intended to make a choice between mono or stereo reproduction of signal A or of signal B and vice versa. The circuit comprises two bistable multivibrator circuits which are controlled by a common, user-operable switch and by characteristic signals which are derived from the characteristic frequencies relevant to the different types of programs. The control is such that when the switch is operated only one bistable multivibrator circuit can be changed over (namely the bistable multivibrator circuit associated with the relevant characteristic frequency received.) A logic circuit which is controlled by the bistable multivibrator circuit as well as by the characteristic signals operates a change-over switch for switching to the desired reproduction.

4 Claims, 4 Drawing Figures

| Z | S | U | V | $X_1$ | $X_2$ | $X_3$ |
|---|---|---|---|---|---|---|
| 0 | 1 | 0 | 0 | C | 0 | 0 |
| 0 | 1 | 0 | 1 | C | 0 | 0 |
| 0 | 1 | 1 | 0 | D | 0 | 1 |
| 0 | 1 | 1 | 1 | D | 1 | 1 |
| 1 | 0 | 0 | 0 | D C | 1 | 0 |
| 1 | 0 | 0 | 1 | C E | 0 | 1 |
| 1 | 0 | 1 | 0 | C E | 1 | 0 |
| 1 | 0 | 1 | 1 | E | 0 | 1 |

| M | K | U | V | $X_1$ | $X_2$ | $X_3$ |
|---|---|---|---|---|---|---|
| 1 | 0 | 0 | 0 | C | 0 | 0 |
| 1 | 0 | 0 | 1 | C | 0 | 0 |
| 1 | 0 | 1 | 0 | C D | 0 | 1 |
| 1 | 0 | 1 | 1 | D | 1 | 1 |
| 1 | 1 | 0 | 0 | D C | 1 | 0 |
| 1 | 1 | 0 | 1 | C E | 0 | 1 |
| 1 | 1 | 1 | 0 | C E | 1 | 0 |
| 1 | 1 | 1 | 1 | E | 0 | 1 |

CIRCUIT FOR RECEIVING TWO-TONE/STEREOPHONIC PROGRAMS

BACKGROUND OF THE INVENTION

The invention relates to a circuit for use in a receiver which is arranged for receiving two-tone/stereophonic programs, each program being accompanied by a pilot signal each having a different characteristic frequency.

Future television broadcasts will be accompanied by either a mono signal, or a stereo signal, or by a two-tone signal. Said last signal is a signal consisting of two mutually independent and different signals, namely a signal A and a signal B. Said signals will particularly be employed for the transmission of spoken text. The signal A then represents, for example, a Dutch version and the signal B, for example, an English version of that text. In order to enable the receiver to know whether a two-tone or a stereophonic program is being broadcast a pilot signal is also transmitted. A signal having a characteristic frequency is modulated on this pilot signal which has a frequency of, for example, 45 kHz. Said characteristic frequency is for example, equal to 117 Hz when a stereo signal is transmitted and 274 Hz when a two-tone signal is transmitted. There are now four possibilities at the receiving end, namely either stereo or mono, or signal A or signal B.

SUMMARY OF THE INVENTION

It is an object of the invention to provide a circuit which enables the user to select one of these four possibilities. This circuit must be of a simple construction, it must be easily implemented in integrated form and it must be operable in a fool-proof way. Said circuit must further function such that once a selection has been made (for example signal A), it is not lost when the transmitter provides for the transmission of one of the other types (for example a stereo program) between two transmissions of the same type (for example between two two-tone program).

According to the invention, this circuit therefore comprises: two bistable multivibrator circuits which are controlled in such a manner by a common, user-operable switch and by characteristic signals derived from the characteristic frequencies that when the switch is operated and in the presence of the characteristic stereo frequency, one bistable multivibrator changes state and the other one does not change its state and that, when the switch is operated and in the presence of the characteristic frequency for the two-tone signals, one bistable multivibrator does not change state while the other one does; a logic circuit which is controlled by the characteristic signals and the output signals of the bistable multivibrator circuits; and a switch which is controlled by the logic circuit to select one of the desired reproduction features.

Characteristic signals are understood to mean binary signals which indicate the presence and/or the absence of characteristic frequencies. In the simplest case, a first characteristic signal is used to indicate the presence and the absence of the characteristic stereo frequency. A second characteristic signal is used to indicate the presence and the absence of the characteristic frequency for the two-tone signal.

The user can now switch, on the one hand, from mono to stereo (and *vice versa*) and, on the other hand, from signal A to signal B (and *vice versa*) by means of one single switch. If the circuit is implemented in integrated form, this single switch therefore requires only one external connection. One of the two bistable multivibrator circuits remembers the choice made by the user during a two-tone program; the other bistable multivibrator circuit remembers the choice the user made during a stereophonic program. As during a program always one of the two bistable multivibrator circuits cannot change state, the user's choice stored therein is retained. Faulty operation is substantially impossible as, once a selection has been made, it can only be changed when a program of the type to which this selection relates, is transmitted and only one switch is provided.

In a further embodiment of the invention each bistable multivibrator circuit is in the form of a divide-by-two divider and the switch is a touch control switch. In the event that each bistable multivibrator circuit (usually a flip-flop circuit) is in the form of a divide-by-two divider, said circuits can only be adjusted to the other state by an edge of a control signal. Such a control signal can now be produced by a touch control switch which is only briefly operated by the user and returns thereafter to its starting position.

As the two bistable multivibrator circuits are operated by only one switch, it is not possible, starting from the position of the switch, to ascertain the state of the two bistable multivibrator circuits, and not at all if a touch control switch is used. In order to make it still possible for the user to get an indication of the selection made, the gate circuit in a further embodiment of the invention is of such a construction that it also controls an indication circuit which can indicate four types of reception.

DESCRIPTION OF THE DRAWINGS

The invention will now be further described by way of non-limitative example with reference to an embodiment shown in the accompanying drawings. Herein.

DESCRIPTION OF THE PREFERRED EMBODIMENTS

Figure 1:
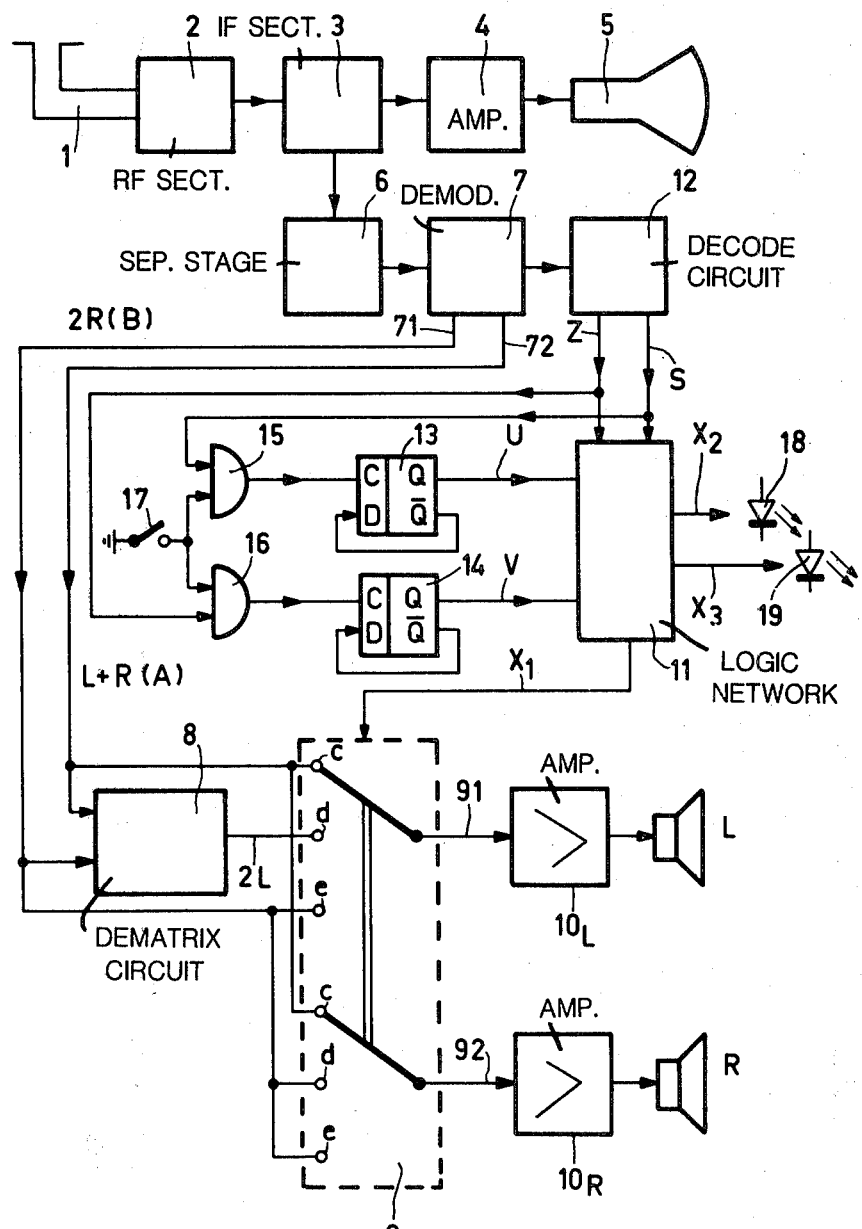
FIG. 1 is a block schematic circuit diagram of a television receiver comprising a circuit in accordance with the invention.

The RF-signal received by an aerial 1 is amplified in an RF section 2 and mixed with an oscillator frequency. The intermediate frequency signal then formed is further processed and demodulated in an IF section 3. The resultant video signal is applied to a picture tube 5 via an amplifier 4.

A separating stage 6 coupled to the IF stage 3 separates the IF-sound signal from the video signal. This sound signal is demodulated in a demodulator 7. Two LF-signals are then produced at the outputs 71 and 72 of the demodulator 7, it being assumed that in the event of stereophonic programs the sum signal L+R and, in the event of two-tone programs, the signal A is present at the output 72, while in the event of stereophonic programs the signal 2R and, in the event of two-tone programs, the signal B is present at the output 71.

The two outputs 71 and 72 of the demodulator 7 are connected to the inputs c and e of a switch 9, and to inputs of a dematrixing circuit 8. In the event of stereophonic programs, the dematrixing circuit 8 generates from the two signals applied to it, the signal (2L) for the left channel and applies it to an input d of the switch 9. The outputs 91 and 92 of switch 9 are connected to LF-amplifiers $10_L$ and $10_R$, respectively, which supply loudspeakers L and R, respectively.

By means of switch 9, it is possible to connect each one of the outputs 91 and 92 to one of the three inputs c, d, or e. In the event of a stereophonic program, the sum signal (L+R) and, in the event of a two-tone program, the signal A is applied to the input c. In the event of stereophonic programs, the signal 2L is applied to the input d in the upper half of the switch and the signal 2R is applied to the input d in the lower half of the switch. The inputs e receive the signal 2R in the event of stereophonic programs and the signal B in the event of two-tone programs. When the switch is in the position shown in the drawing, mono reproduction is obtained in stereo broadcasts, while in two-tone broadcasts, the signal A is reproduced. If the outputs 91 and 92 are connected to the inputs d, then stereophonic reproduction is obtained. If these outputs 91 and 92 are connected to the inputs e, then the signal B is reproduced in the event of two-tone broadcasts. The position of the change-over switch 9 is determined by a data word $x_1$ comprised of at least two bits and produced by a logic network 11. Switches whose positions can be controlled by a digital data word are known; see, for example, the Philips integrated circuit TDA 1029.

The logic circuit 11 has four control inputs, two of which are connected to a decoding circuit 12 which is connected to the demodulator 7. Said decoding circuit 12 produces two characteristic signals Z and S. More particularly, the signal Z has the logic value "1" when a two-tone program is received, in all other cases Z has the logic value "0". In a corresponding manner it holds that the signal S has the logic value "1" only when a stereophonic program is received, in all other cases S has the logic value "0".

The two other control inputs of the logic circuit 11 are connected to outputs of bistable multivibrator circuits 13 and 14, respectively, the respective input signals U and V of which depend on the state of the multivibrator circuits. The two bistable multivibrator circuits 13 and 14 may each be formed by a D-flip-flop, the inverted output of which is fed back to the D-input. The clock pulse inputs of the D-flip-flops are connected to the outputs of an AND-gates 15 and 16, respectively. An input of the AND-gate 15 is connected to the output of the decoding circuit 12 and receives the characteristic stereo signal S. The characteristic two-tone signal Z is applied to an input of the AND-gate 16. A second input of the AND-gate 15 and a second input of the AND-gate 16 are both connected to one pole of a touch control switch 17, the other pole of which being connected to ground.

For a better understanding of the invention, let it be assumed that the logic value "1" corresponds to a voltage of 0 Volt and that the logic value "0" corresponds to, for example, a voltage of 12 V.

If it is further assumed that the bistable multivibrator circuits 13 and 14, respectively, change state at every 0-1 transition then, when the touch control switch 17 is operated, the multivibrator circuit 13 and 14, respectively, change state when the characteristic signal S and the characteristic signal Z, respectively, has the logic value "1", that is to say when a stereophonic program or a two-tone program is broadcast. As at all times only one of the two types of programs can be broadcast, the output of only one of the two AND-gates 15 or 16 can change from 0 to 1 when the switch 17 is operated, as a result of which the associated multivibrator circuit 13 or 14, respectively, changes state. When thereafter the touch control circuit 17 is operated again, this causes said multivibrator circuit 13 or 14 to change state again without affecting the state of the other multivibrator circuit 14 or 13, respectively.

The circuit operates as follows: For mono program it holds that: Z=S=0. The gates 15 and 16 are then in the non-conducting state so that operating the switch 17 does not affect the state of the bistable multivibrator circuits 13 and 14. When a stereophonic program is received it holds that: Z=0 and S=1, so that, when the touch control switch 17 is operated, the output of AND-gate 15 changes from 0 to 1, in response to which the bistable multivibrator circuit 13 changes state, for example from 0 to 1. When the switch 17 is operated again, the multivibrator circuit 13 returns to the starting position (from 1 to 0). For a two-tone program it holds that: Z=1 and S=0, so that AND-gate 15 is non-conducting, while the output of AND-gate 16 changes from 0 to 1 when switch 17 is operated. As a result thereof, the bistable multivibrator circuit 14 connected thereto changes state. The output signal U of the bistable multivibrator circuit 13 is characteristic of the user's choice in the evnet of a stereo program, while the output signal V of the bistable multivibrator circuit 14 is characteristic of the user's choice in the event of a two-tone program. Once the user has made a choice, said choice is stored in the respective bistable multivibrator circuit 13 or 14.

Instead of a feedback D-flip-flop, other circuits may alternatively be used as bistable multivibrator circuits 13 and 14, for example a J, K-flip-flop, the J, K-inputs of which are interconnected, and to which the characteristic signal Z or the characteristic signal S is applied. Switch 17 may be connected to the clock pulse input of this J, K-flip-flop.

Since the user's choice cannot be indicated by the position of the touch control switch 17, a different indication is required, for example an optical indication. This function is performed by the two light-emitting diodes 18 and 19, which are also controlled by the logic circuit 11. For this purpose, said logic circuit 11 produces two output signals $x_2$ and $x_3$ which switch the diodes on and off, respectively, in a manner not further shown. Four modes can be indicated by means of the two diodes: stereo (both diodes in the on-state), mono (both diodes in the off-state), signal A (diode 18 on, diode 19 off) and signal B (diode 18 off, diode 19 on).

Figures 2, 3, 4:
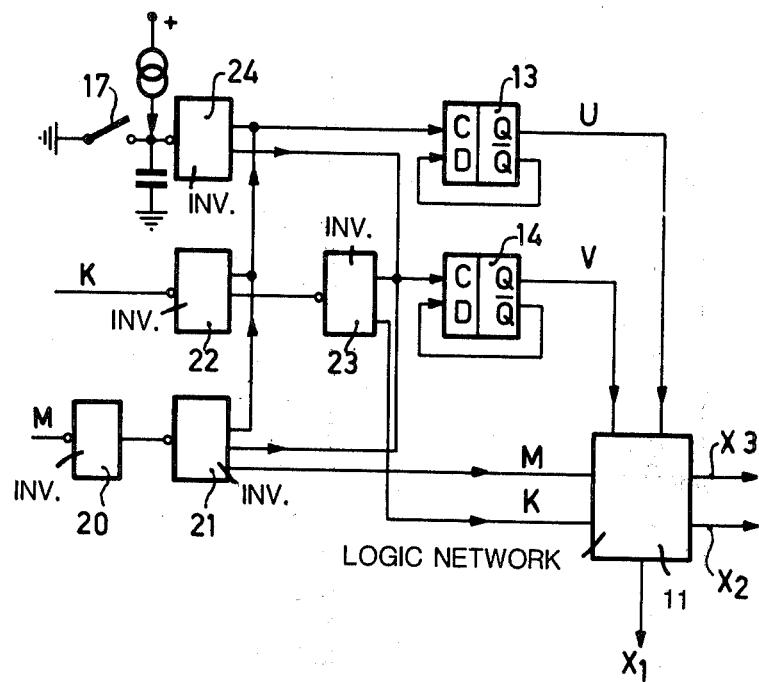
FIG. 2 shows a different embodiment.
FIGS. 3 and 4 are truth tables for the logic gate circuit.

FIG. 3 shows the truth table of the logic circuit 11. Herein C, D, E are the data words which so control the switch 9 that the inputs c, d, e are connected to outputs 91 and 92, respectively. $x_2$ and $x_3$, respectively = 0 signifies that the diodes 18 and 19, respectively are not in the switched-on state and $x_2$, $x_3$ = 1 signifies that the relevant diode is in the switched-on state. From this truth table it follows that, for example in the event of a stereo program being broadcast (S=1), the switching state V of the bistable multivibrator circuit 14 does not affect the output signals $x_1$, $x_2$, $x_3$. Conversely, for two-tone programs the switching state U of the bistable multivibrator circuit 13 does not affect the output signals. The truth table comprises only half the number of theoretically conceivable input signal combinations. If Z=S=0, then, independent of U and V, $x_1$=C and $x_2$=$x_3$=0, while the input signal combination Z=S=1 is not possible as stereophonic programs and two-tone programs cannot be transmitted simultaneously.

The circuit shown in FIg. 2 has the same functions as the circuit formed by the blocks 13 to 17, inclusive in FIG. 1. From the constructional point of view, there are the following differences:

(a) A voltage of 0 V now corresponds to the logic 0, a voltage of, for example, 12 V corresponding to the logic 1.

(b) Instead of the characteristic signals Z and S, the characteristic signals K and M are used. M=0 then means that the signal received does not comprise a characteristic frequency and M=1 means that the signal contains a characteristic frequency. For the case that M=1, K=0 indicates a stereo program and K=1 indicates a two-tone programme. For the generation of characteristic signals of this type the associated decoder, not further shown, must be of a different construction than the decoder shown in FIG. 1. If a digital evaluation is employed the digital characteristic signals K and M can also be obtained directly.

(c) The blocks 20 to 24, inclusive are inverter circuits which have one or more outputs and which can be easily produced with the aid of I$^2$L. Each output is then formed by the collector of a, the emitter of which is connected to ground. The supply voltage U$_B$ corresponds to a logic value "1". An inverter circuit having multiple outputs is formed by a transistor having several collector zones. When the output of several inverter circuits are interconnected, the output voltage can only then amount to U$_B$ (logic "1") when the potential at each of the outputs is equal to U$_B$. If only one of the inverter circuits produce a 0 V output voltage, then 0 V is produced at the common junction. So for the inverted input signals, the connected outputs operate as an AND-gate (what is commonly referred to as an "open-collector-logic").

The circuit shown in FIG. 2 operates as follows: For mono programs M=0, so that, because of the dual inverter operation, also the outputs of the inverter 21 have the logic value "0". As outputs of the circuits 21 are connected to the clock pulse input C of the bistable multivibrator circuits 13 and 14, these clock pulse inputs always remain "0", irrespective of the fact if, for example, the touch control switch 17 is operated or not operated. The switching state of the bistable multivibrator circuits 13 and 14 is consequently maintained. For stereo reception, M=1 and K=0. The output of the inverter 22 and also the outputs of the inverter 21 now produce a logic value "1". If the touch control switch 17 is then closed, the output of the inverter 24 connected thereto also has the logic value "1" so that a transition from "0" to "1" takes place at the common junction of the outputs of the inverters 21, 22, 24 and consequently at the clock pulse input of the bistable multivibrator circuit 13. When the touch control switch is closed again, then this signal returns to "0" and the bistable multivibrator circuit 13 changes state. In contrast therewith, operating the switch 17 does not influence the state of the bistable multivibrator circuit 14 as the characteristic signal K reaches the inverter 23 via the inverter 22. As a result of the dual inversion, the original signal K, which in this case has the value "0" and which is applied to the clock pulse input of the bistable multivibrator circuit 14, is now produced at the output of inverter 23. When a two-tone signal is broadcast K=1, M=1), the situation is reversed as then the output of the inverter 22 has the value "0", so that the input of the bistable multivibrator circuit 13 connected thereto is inhibited, while in this case the bistable multivibrator circuit 14 changes state when the touch control switch 17 is operated.

FIG. 4 shows the truth table of the circuit of FIG. 2, however only for M=1. For M=0 (mono program), $x_1$ is always equal to C and $x_2=x_3=0$.

What is claimed is:

1. A circuit for use in a receiver which is arranged for receiving two-tone and stereo programs, each program being accompanied by a pilot signal each having a different characteristic frequency, said circuit enabling an operator to select one of the tones for reproduction from a two-tone program or monophonic or stereophonic reproduction from a stereo program, characterized in that said circuit comprises:

means for generating, in the alternative, two characteristic signals from said pilot signals, said means having outputs for respectively providing said characteristic signals;

two bistable multivibrator circuits coupled, respectively, to said generating means outputs, an operator controllled switch coupled to said bistable multivibrator circuits for changing the state of one of said bistable multivibrator circuits;

means responsive to said characteristic signals and said operator controllable switch for controlling which of said bistable multivibrator circuits changes state:

a logic circuit coupled to the outputs of said bistable multivibrator circuits and said generating means outputs, said logic circuit producing a data word representing the type of program being received and the operator selected form of reproduction; and automatic switching means controlled by said data word for selecting the desired mode of reproduction.

2. A circuit as claimed in claim 1, characterized in that each bistable multivibrator circuit is connected as a divide-by-two divider and that the operator controllable switch is in the form of a touch control switch.

3. A circuit as claimed in claim 2, characterized in that a fedback D-flip-flop, the clock pulse input of which is coupled to the operator controllable switch, is used as said bistable multivibrator circuit.

4. A circuit as claimed in claim 1, 2 or 3, characterized in that said circuit further comprises an indicator circuit controlled by said logic circuit for indicating the four receiving modes.

* * * * *